(No Model.)

B. FRÖHLICH.
ELASTIC STEEL TIRE.

No. 563,761. Patented July 14, 1896.

Witnesses.
J. C. Lebret.
O. Block.

Inventor.
Bernhard Fröhlich,
By H. Adelbos.
Attorney.

UNITED STATES PATENT OFFICE.

BERNHARD FRÖHLICH, OF LEIPSIC, GERMANY.

ELASTIC STEEL TIRE.

SPECIFICATION forming part of Letters Patent No. 563,761, dated July 14, 1896.

Application filed December 31, 1895. Serial No. 573,894. (No model.)

*To all whom it may concern:*

Be it known that I, BERNHARD FRÖHLICH, a subject of the King of Saxony, residing at Leipsic, Saxony, Germany, have made a new and useful invention in the Improvements of Elastic Steel Tires for Cycles and other Vehicles, of which the following is a full and exact specification.

This invention has for its object an elastic steel tire, which can be used instead of the pneumatic tires now ordinarily used and by means of which improved tire very great elasticity is obtained. Instead of the ordinary methods of construction in which in the pneumatic tire elastic materials are brought more or less close to each other, or in which an elastic tire of india-rubber or other elastic material is attached to the wheel-tire by lacing, the tire in the present invention is composed of a number of extremely elastic steel springs, which are surrounded by an outer steel band, over which the ordinary-covering tire is directly fitted.

Figure 1:
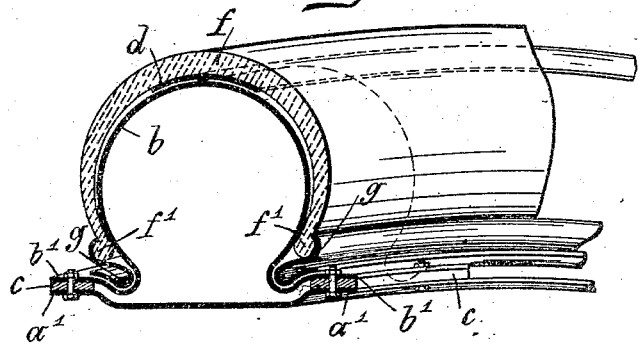
Figure 2:
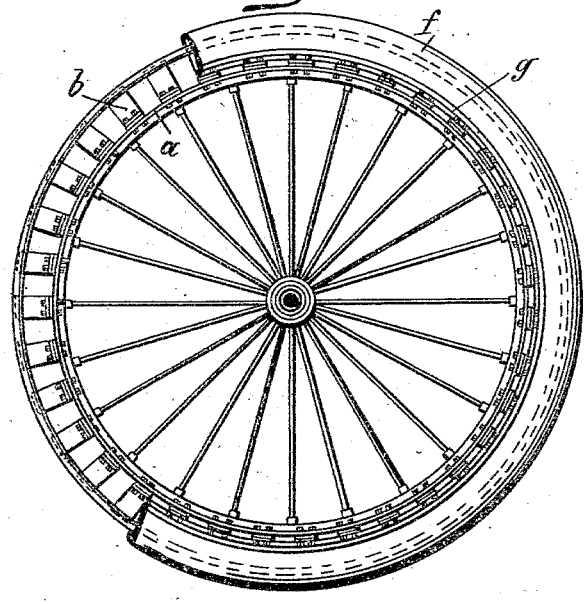

In the accompanying drawings, which are illustrations of the invention, Figure 1 is a section through the tire, and Fig. 2 a side view with the covering-tire partly removed.

The wheel-rim $a$ is bent into V-form in section, and is provided on both sides with wide flanges $a'$. These flanges serve to hold the separate steel springs $b$, which are bent into a circular form transversely, their outer ends being bent down and around as shown, and having flanges $b'$ corresponding with those $a'$, already described. There are a large number of the springs $b$, and they are fixed at a suitable distance apart round the wheel-rim $a$. Between the flanges $a'$ of the wheel-rim and those $b'$ of the elastic steel springs $b$ a strip of india-rubber $c$ is placed, in order to further increase the elasticity of the springs $b$. The springs $b$ may be fastened to the rim $a$ by rivets, screws, or other equivalent means. Round the elastic springs $b$ is fitted a very light elastic steel strip or ring $d$, which is attached to some or all of the springs. Outside the steel band $d$ and the separate elastic springs the outer flexible covering-tire $f$ is fitted, and is held, by means of its thickened edges $f'$, by the bent steel bands $g$, which can either be riveted to the springs $b$ or may consist of a separate ring, in which case such ring $g$ must be first arranged around the wheel-rim and the separate springs be then introduced. In this way an elastic tire is formed at least as efficient as a pneumatic tire, and having the advantage of greater safety without the cost being increased.

Having now particularly described and ascertained the nature of my said invention and in what manner the same is to be performed, I declare that what I claim is—

1. In a bicycle-tire, the combination with the rim having outwardly-extending flanges at opposite sides, of the series of springs provided with outwardly-extending flanges and arranged at intervals around the circumference of the rim, an elastic packing between the flanges of the rim and springs, means to secure said flanges together, a metallic strip or ring connecting said springs together, and an inclosing flexible tire secured to said parts to form the tread of the wheel, substantially as described.

2. In a bicycle-tire, the combination with the rim having outwardly-extending flanges, of the series of springs having their ends turned outwardly to lie over said flanges, an elastic packing between the flanges of the rim and the outwardly-turned ends of the springs, means to secure the springs to the rim, a metallic strip or ring connecting said springs together to prevent lateral movement thereof, an inclosing flexible tire formed with enlarged edges, and metallic rings encircling the opposite sides of said rim and provided with inturned edges to engage the enlarged edges of the tire to hold the tire in place, substantially as described.

In testimony whereof I have signed my name to this specification in the presence of two subscribing witnesses.

BERNHARD FRÖHLICH.

Witnesses:
 RUDOLPH FRICKE,
 OTTO W. OEDERLEIN.